United States Patent [19]
Kim et al.

[11] Patent Number: 5,717,438
[45] Date of Patent: Feb. 10, 1998

[54] MULTIMEDIA DOCUMENT USING TIME BOX DIAGRAMS

[75] Inventors: Michelle Y. Kim; Junehwa Song, both of Scarsdale, N.Y.; Daniel Tunkelang, Pittsburgh, Pa.

[73] Assignee: International Business Machines Corporation, Armonk, N.Y.

[21] Appl. No.: 519,261

[22] Filed: Aug. 25, 1995

[51] Int. Cl.$^6$ .................................................. G06F 17/00
[52] U.S. Cl. .......................... 345/302; 707/539; 707/517
[58] Field of Search ................................. 395/762, 764, 395/765, 806, 807, 779, 802

[56] References Cited

U.S. PATENT DOCUMENTS

| | | | |
|---|---|---|---|
| 5,386,581 | 1/1995 | Suzuki et al. | 395/800 |
| 5,394,548 | 2/1995 | Nakajima et al. | 395/673 |
| 5,515,490 | 5/1996 | Buchanan et al. | 395/807 |
| 5,546,517 | 8/1996 | Marks et al. | 395/762 |
| 5,553,212 | 9/1996 | Etoh et al. | 395/140 |

OTHER PUBLICATIONS

Hamakawa et al., "Object Composition and Playback Models for Handling Multimedia Data", Proceedings of the First ACM International Conference on Multimedia, Jan. 1993.

lino et al., "An Object-Oriented Model for Spatio-Temporal Synchronization of Multimedia Information", Proc. of the Int'l Conf. on Multimedia Computing and Systems, pp. 110-119, May 15, 1994.

Weitzman et al., "Automatic Presentation of Multimedia Documents Using Relational Grammars", Proc. of ACM Multimedia '94, pp. 443-451, Oct. 15, 1994.

Kamada et al., "A General Framework for Visualizing Abstract Objects and Relations", ACM Transactions on Graphics, v. 10, n. 1, pp. 1-39, Jan. 1991.

Borning et al., "Constraint-based tools for building user interfaces", ACM Transactions on Graphics, v. 5, n. 4, pp. 345-374, Oct. 1986.

Myers et al., "Environment for rapidly creating interactive design tools", The Visual Computer, v. 8, pp. 94-116, Jan. 1992.

Feiner, "A Grid-based approach to automating display layout", Graphics Interface '88, pp. 192-197, Jun. 6, 1988.

(List continued on next page.)

*Primary Examiner*—Joseph R. Burwell
*Attorney, Agent, or Firm*—Whitham, Curtis, Whitham & McGinn; Jay P. Sbrollini, Esq.

[57] ABSTRACT

A computer-implemented method of drawing a multimedia story including at least one episode is provided which represents a plurality of multimedia fries (e.g., text, sound, video, and picture files) graphically in a "time-box" which can be connected to other time boxes to for a time box diagram. A user can easily stretch or shrink, reposition, delete, or otherwise manipulate the fries graphically using the time boxes in order to produce a final multimedia story within given temporal (time) constraints. The method according to the invention includes steps of inputting to a processor story data having at least one episode, and, for each episode, generating first and second events and temporal constraints. Thereafter, from the temporal constraints, first coordinates of each of the first and second events for each of the episodes are determined, and the first and second events are assigned to layers based on a temporal position of the first and second events such that for each episode the first and second events are temporally connected. Thereafter, an order of events on each layer of the layers is permuted, and, from the order of the events on each layer and the temporal constraints, second coordinates of each of the first and second events for each of the episodes are determined. Finally, a layout of the story is generated.

20 Claims, 23 Drawing Sheets

OTHER PUBLICATIONS

Haarslev et al., "Visualization and graphical layout in object-oriented systems", J. of Visual Languages and Computing, v. 3, pp. 1–23, Mar. 1992.

Graf, "LAYLAB—A constraint-based layout manager for multimedia presentations", Proc. of 5th Int'l Conf. on Human–Computer Interaction (HCI Int'l '93), pp. 446–451, Aug. 8, 1993.

Luders et al., "Improvement of the User Interface of Multimedia Applications by Automatic Display Layout", Proc. of Multimedia Computer and Networking 1995, pp. 54–64, Feb. 6, 1995.

Preprocessing

110 — For Each Episode $E_i$, Generate Two Events, $B(E_i)$ & $E(E_i)$, Meaning Begin of $E_i$ and End of $E_i$

FIG.8

Assignments of X Coordinate

340 — For Each Episode $E_i$, if $B(E_i)$ and $E(E_i)$ are not on Consecutive Layers, Insert Dummy Events, $d_1(E_i)$, $d_2(E_i)$, ... $d_j(E_i)$, on the Intermediate Layers. This is to Guarantee the Edges are Only between Consecutive Layers.

350 — For Each Episode $E_i$, Insert Edges, from $B(E_i)$ to $d_1(E_i)$, from $d_1(E_i)$ to $d_2(E_i)$, ..., from $d_j(E_i)$ to $E(E_i)$. If $B(E_i)$ and $E(E_i)$ are on Consecutive Layers, Insert Only One Edge from $B(E_i)$ to $E(E_i)$.

FIG.10B

360 — For Each Meet $(E_i, E_j)$, if $E(E_i)$ and $B(E_j)$ are not on the Consecutive Layers, Insert Dummy Events, $d_1(E_i, E_j)$, $d_2(E_i, E_j)$, ... $d_k(E_i, E_j)$ on the Intermediate Layers.

370 — For Each Meet $(E_i, E_j)$, Insert Edges, from $E(E_i)$ to $d(E_i, E_j)$, from $d_1(E_i, E_j)$ to $d_2(E_i, E_j)$, ..., from $d_k(E_i, E_j)$ to $B(E_j)$. If $E(E_i)$ and $B(E_j)$ are on the Consecutive Layer, Insert Only One Edge from $E(E_i)$ to $B(E_j)$.

FIG. 10C

510 — For Each Episode $E_i$, $y(B(E_i)) = y(d_1(E_i)) = \ldots = y(d_j(E_i)) = y(E(E_i))$.

$d_k(E_i)$ means the Dummy Events between $B(E_i)$ and $E(E_i)$ inserted in Step 340.

520 — For Each Meet $(E_i, E_j)$, $y(d_1(E_i, E_j)) = y(d_2(E_i, E_j)) = \ldots = y(d_k(E_i, E_j)) = y(B(E_j))$.

$d_\ell(E_i, E_j)$ means the Dummy Events inserted in Step 360.

FIG. 12A

530 — For Each Layer, let $r_1,...,r_k$ be the Relative Ordering Decided in Step 400, Then
$$y(r_2) - y(r_1) \geq \delta$$
$$y(r_3) - y(r_2) \geq \delta$$
$$\vdots$$
$$y(r_k) - y(r_{k-1}) \geq \delta$$

(cf) $\delta$ Means the Predefined Vertical Minimum Distance Between Time Boxes.

540 — Subject to the Constraints from Above Steps (510 ~ 530), Use Linear Program with Objective Function, $$\min \left( \Sigma |y(e_i) - y(e_j)| \right)$$

for Each Pair of Events.

FIG. 12B $e_i$ and $e_j$, such that $$\begin{cases} e_i \text{ is either } B(E_k) \text{ or } E(E_k) \\ e_j \text{ is either } B(E_l) \text{ or } E(E_l) \end{cases}$$

and $$\begin{cases} \text{meet } (E_k, E_l) \text{ or} \\ \text{cobegin } (E_k, E_l) \text{ or} \\ \text{coend } (E_k, E_l) \text{ or} \\ \text{cooccur } (E_k, E_l) \end{cases}$$

for Some Episodes $E_k$ and $E_l$

550 — y Coordinate Values for Each Events

FIG.12C

Results of
260, 270
280
$$\begin{cases} x(B(E_1)) = x(B(E_4)) \\ x(E(E_3)) = x(E(E_5)) \\ x(E(E_1)) = x(E(E_4)) \\ x(B(E_2)) = x(B(E_5)) \end{cases}$$

FIG.13A

Results of
210
$$\begin{cases} x(E(E_1)) - x(B(E_1)) = 3 \ (=\ell_1) \\ x(E(E_2)) - x(B(E_2)) = 4 \ (=\ell_2) \\ x(E(E_3)) - x(B(E_3)) = 5 \ (=\ell_3) \\ x(E(E_4)) - x(B(E_4)) = 7 \ (=\ell_4) \\ x(E(E_5)) - x(B(E_5)) = 5 \ (=\ell_5) \end{cases}$$

FIG.13B

Results of
250
$$\begin{cases} x(B(E_2)) - x(E(E_1)) \geq 3 \ (= E) \\ x(B(E_3)) - x(E(E_2)) \geq 3 \ (\text{"}) \\ x(B(E_5)) - x(E(E_4)) \geq 3 \ (\text{"}) \end{cases}$$

FIG.13C

Step 290
Objective Function = Min $\{x(E(E_1)) + x(E(E_2)) + x(E(E_3)) + x_4(E(E_4)) + x(E(E_5))\}$

FIG.13D

Result of X coordinates (Step 290)

Result of layering (step 330)

Relative Ordering of Events in Each Layer (Result of 420)

| Layer | 0 | 1 | 2 | 3 | 4 | 5 | 6 |
|---|---|---|---|---|---|---|---|
| | $B(E_1)$ ↓ $B(E_4)$ | $E(E_1)$ ↓ $d_1(E_4)$ | $B(E_2)$ ↓ $d_2(E_4)$ | $d(E_2)$ ↓ $E(E_4)$ | $E(E_2)$ ↓ $d_1(E_4,E_5)$ | $B(E_3)$ ↓ $B(E_5)$ | $E(E_3)$ ↓ $E(E_5)$ |

(cf)  $d_1(E_4)$, $d_2(E_4)$, $d_1(E_4,E_5)$ : Dummy Events

FIG. 13G

Constraints to get Y coordinate

Result of 510
$$\begin{cases} y(B(E_1)) = y(E(E_1)) \\ \vdots \\ y(B(E_5)) = y(E(E_5)) \end{cases}$$

FIG.13H

Result of 530
$$\begin{cases} y(B(E_4)) - y(B(E_1)) \geq 2 \quad (=\delta) \\ y(E(E_4)) - y(E(E_1)) \geq 2 \quad (=\delta) \\ y(B(E_5)) - y(B(E_2)) \geq 2 \quad (=\delta) \\ y(E(E_4)) - y(E(E_3)) \geq 2 \quad (=\delta) \end{cases}$$

FIG.13I

Objective Function :

$$\text{Min} \left| y(B(E_2)) - y(E(E_1)) \right|$$
$$+ \left| y(B(E_3)) - y(E(E_2)) \right|$$
$$+ \left| y(B(E_5)) - y(E(E_4)) \right|$$
$$+ \left| y(B(E_1)) - y(E(E_4)) \right|$$
$$+ \left| y(E(E_3)) - y(E(E_5)) \right| + \left| y(E(E_3)) - y(E(E_5)) \right|$$

FIG.13J

Assign X Coordinates (step 1200)

2900

Use Linear Programming Techniques to Minimize $$\sum \left| X_{new}(n_i) - X_{prev}(n_i) \right|$$

Where $n_i$ is either $B(E_k)$ or $E(E_k)$ for some episode $E_k$.

Where $X_{new}$ means the X coordinate in the new story and $X_{prev}$ means that in the previous story.

FIG.15

MULTIMEDIA DOCUMENT USING TIME BOX DIAGRAMS

CROSS REFERENCE TO RELATED APPLICATIONS

The present application is related to copending U.S. patent application Ser. Nos. 08/392,717, 08/392,701, 08/396,823, 08/371,903, 08/371,630, 08/843,312 which is a continuation of 08/127,863, and 08/013,888, all commonly-assigned and incorporated herein by reference.

BACKGROUND OF THE INVENTION

1. Field of the Invention

The present invention generally relates to composing and playing multimedia documents and, more particularly, to automatically generating a spatial and temporal layout of the multimedia segments on a computer display screen.

2. Description of the Related Art

Electronic multimedia documents have become a popular media for storing multimedia documents such as encyclopedias and the like since this media is capable of storing a large amount of data, including text, graphics, action video, sound, and the like, which when combined form a multimedia document. The user of a multimedia document typically presents or receives multimedia information called fragments, segments, or multimedia objects, hereinafter called "episodes", through the computer input or output mechanism, respectively.

Generally, these multimedia episodes include information having a sensory quality that can take the form of audio and visual information such as audio and video clips, musical recordings, speech, typed text, still pictures, drawings, animation, choreographed dance steps, and the like.

Time is an essential component in interactive multimedia documents. Many multimedia forms, such as audio, video, and animation, have an inherent temporal dimension. Moreover, combinations of various media types into compound documents often involve temporal constraints. Adopting a metaphor of electronic building blocks, complex multimedia documents are created by stacking and arranging "time boxes" on the screen.

Moreover, multimedia authoring can be viewed as a process of ordering multimedia objects, such as texts, graphics, sounds and videos in time and space. A set of multimedia objects, or episodes, to which a certain ordering has been given is called a "story". Thus, a multimedia document can be seen as an ordered collection of multimedia information fragments, consisting of audio, videos, still images, and graphics, etc. This collection may have both a spatial and a temporal arrangement.

However, the conventional systems are problematic in visually representing time in a multimedia document in that they do not provide any visual representation to the users.

Furthermore, some systems may provide a time-line (or some variation of it) upon which some multimedia objects can be attached. However, these systems lack the flexibility in handling documents, especially when parts of the documents undergo changes.

SUMMARY OF THE INVENTION

It is therefore an object of the present invention to provide a method and apparatus for overcoming the above-mentioned problems of the conventional systems.

Another object is to provide a method and apparatus for visually representing time in a multimedia document and upon which the temporal dimension is focused.

Yet another object is to provide a method that reduces the complexities of obtaining a temporal design in a multimedia presentation.

It is another object of the invention to provide an interactive process which assists an author in readily arriving at a suitable temporal design in a multimedia presentation.

According to the present invention, a new approach to representing multimedia documents is provided. More specifically, time box diagrams are introduced according to the invention to represent the temporal constraints in a multimedia document. The invention focusses on the expressive power of the time box model, and the computational problem of generating the diagrams.

More specifically, the temporal dimension of multimedia elements is expressed as time boxes, and on the arrangement of these elements in terms of a system of temporal relationships. The computational issues both of solving the system of constraints and of visualizing the system, are expressed as a time box diagram. Such a method and corresponding structure eases the multimedia authoring process.

The present invention uses the temporal relationships among multimedia objects to describe a multimedia document as a temporally constrained system. In the inventive model for a multimedia document, multimedia objects are the fundamental electronic building blocks. Just as ordinary building blocks can be stacked or placed next to each other, the inventive electronic building blocks can be constrained to star together, end together, occur one after the other, or coincide. The documents themselves have lengths in the temporal dimension. Typically, these lengths have lower and upper bounds within which the length can be "stretched."

Visually, these electronic building blocks are represented with "time boxes" whose lengths correspond to the lengths of the documents. The present invention represents the system of temporal constraints with time box diagrams. In these two-dimensional diagrams, the horizontal direction denotes time, and the vertical direction is used to show concurrency of blocks.

The invention determines horizontal positions for the time boxes that conform to the temporal constraints and determines vertical positions so as to maximize the legibility and aesthetics of the diagram. Moreover, the present invention is directed to developing the time box model and the computation of time box diagrams.

In a first aspect of the invention, a computer-implemented method of drawing a multimedia story including at least one episode is provided. The method according to the invention includes steps of inputting to a processor story data having at least one episode, and, for each episode, generating first and second events and temporal constraints. Thereafter, from the temporal constraints, first coordinates of each of the first and second events for each of the episodes are determined, and the first and second events are assigned to layers based on a temporal position of the first and second events such that for each episode the first and second events are temporally connected. Thereafter, an order of events on each layer of the layers is permuted, and, from the order of the events on each layer and the temporal constraints, second coordinates of each of the first and second events for each of the episodes are determined. Finally, a layout of the story is generated.

BRIEF DESCRIPTION OF THE DRAWINGS

The foregoing and other objects, aspects and advantages will be better understood from the following detailed description of a preferred embodiment of the invention with reference to the drawings, in which:

FIG. 8 illustrates the preprocessing step 100 according to the present invention;

FIGS. 10A–10C illustrate the layering step 300 of the processing flow of the static generator according to the present invention;

FIGS. 12A–12C illustrate the assignments of Y coordinates in step 500 of the processing flow of the static generator according to the present invention;

FIGS. 13A–13J illustrate: the results of steps 260–280; the result of step 210; the result of step 250; the objective function used in step 290; the result of assigning X coordinates in step 290; the result of layer step 330; the result of step 420; the constraints to get the Y coordinates which are the result of step 510; and the result of step 530; and the objective function used in step 540, respectively.

FIG. 15 illustrates a portion of the step of assigning X coordinates with the dynamic generator according to the present invention.

DETAILED DESCRIPTION OF A PREFERRED EMBODIMENT OF THE INVENTION

Figure 1A:
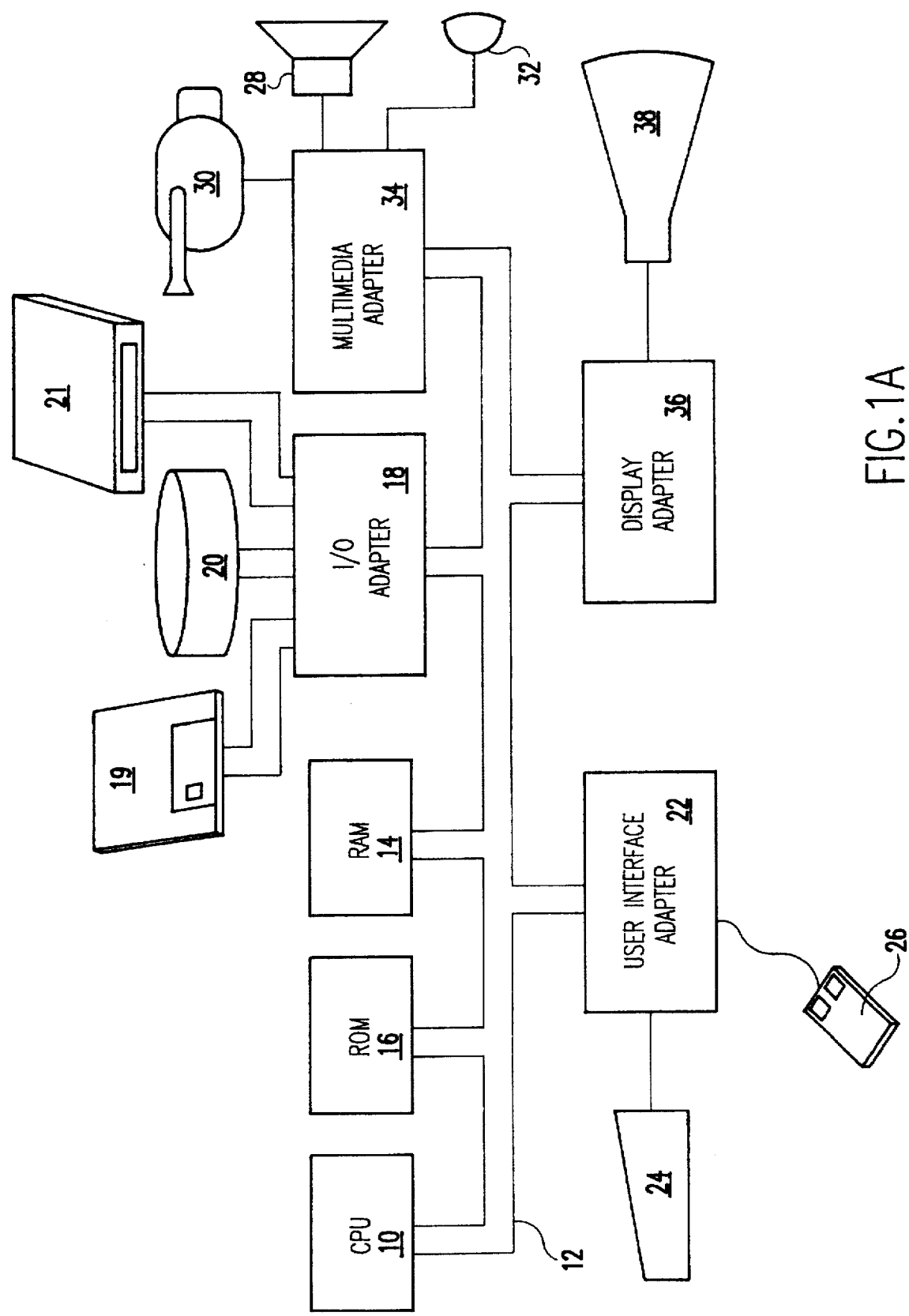
FIG. 1A is a block diagram showing a hardware configuration on which the subject invention may be implemented.

Referring now to the drawings, and more particularly to FIG. 1, there is shown for the present invention an exemplary hardware environment which may include a personal computer, such as the International Business Machines (IBM) Corporation's Personal System/2 (PS/2) family of Personal Computers.

The hardware includes a central processing unit (CPU) 10, which may conform to Intel's X86 architecture or may be a reduced instruction set computer (RISC) microprocessor such as IBM's PowerPC microprocessor.

The CPU 10 is attached to a system bus 12 to which are attached a read/write or random access memory (RAM) 14, a read-only memory (ROM) 16, an input/output (I/O) adapter 18, and a user interface adapter 22. The RAM 14 provides temporary storage for application program code and data, while ROM 16 typically includes the basic input/output system (BIOS) code.

The I/O adapter 18 is connected to one or more Direct Access Storage Devices (DASDs), such as for example a floppy drive 19, a hard disk drive 20 and a CD-ROM 21. The hard disk drive 20 typically stores the computer's operating system (OS), such as IBM's OS/2 operating system, and various application programs, each of which are selectively loaded into RAM 14 via the system bus 12. The user interface adapter 22 has attached to it a keyboard 24, a mouse 26, and/or other user interface devices (not shown).

The personal computer or workstation also includes a display 38, which may be, for example, a cathode ray tube (CRT) display but which also may be a liquid crystal display (LCD) or other suitable display. The display 38 is connected to the system bus 12 via a display adapter 36. A multimedia adapter 34, such as Intel Corporation's ActionMedia II Display Adapter, is connected to the bus 12 and to a microphone 32, a speaker 28 and a video camera 30 for audio/video capture and playback. The multimedia adapter 34 is supported by suitable software, such as IBM's Multimedia Presentation Manager/2. The inventive approach has been implemented in Smalltalk/OS2 as part of the Isis Authoring Environment.

As will be understood by those skilled in the art, other multimedia hardware and software may be incorporated into the system, including but not limited to video cassette recorders (VCRs), laser disk players, surround sound processors, and the like.

In the practice of the invention, multimedia objects in a story are viewed as defining time intervals over which they play. It is useful to be able to deal with a range of time intervals bounded by a minimum and a maximum. For instance, a video segment may be played at a rate of 30 frames/second, or perhaps a bit slower or a bit faster. Similarly, audio segments, graphics animation, text segments, or still frames may be associated with a range of acceptable speeds and play duration at which they can be presented.

Depending on the constraints that are given, an appropriate speed may be selected for each segment. This is where stretchability comes in. Intuitively, consider mapping the presentation onto a time-line that is stretchable (or shrinkable). To use an analogy, imagine a multimedia presentation consisting of a set of springs connected according to relationships that are given.

Using this analogy, each multimedia object is associated with a triple of lengths, a minimum length, corresponding to the compressed length of the spring, a maximum length, corresponding to the stretched length of the spring, and an optimum length, corresponding to the spring at rest.

A multimedia story is composed by selecting among a list of episodes. Each episode must have associated with it the triple of lengths just described. This is done, for example, using the user interactive screen shown in FIG. 1B. From the list of episodes, an episode is selected. The selected episode is graphically represented in the upper left corner of the screen by the icon 201. Using a pointing cursor, the user selects one of the lengths of the triple by clicking on one of the buttons 202, 203 or 204 for "min", "opt" or "max", respectively. Then, clicking on and dragging the slider 205 in the time line 206, the user sets the time.

In the example illustrated, the user has selected the button 203 for "opt" and set the slider 205 at ten seconds. Alternatively, the user can type in the time in window 207. The time shown in the window 207 and the slider 205 are linked such that as the slider is moved, the value displayed in the window changes and vice versa; that is, typing a value in the window 207 will result in the slider 205 moving to that value. When the user is satisfied with the value for the selected length, the "set" button 208 is selected, and when the user has selected all three lengths of the triple, the "done" button 209 is selected. At any time in the process before selecting the "done" button 208, the "cancel" button 210 may be selected to abort the process.

The example illustrated shows that the minimum length selected is two seconds and the maximum length selected is 19.9 seconds. Arrow buttons 211 and 212 at the end of the time line 206 may be used to incrementally move the slider 205 step-by-step. While the time line extends from zero to twenty seconds, it may be extended or contracted by selecting an appropriate one of the arrow buttons 213 or 214 in the lower corners of the window, thus accommodating a wide variety of time periods for various episodes which make up a story.

Figure 1B:
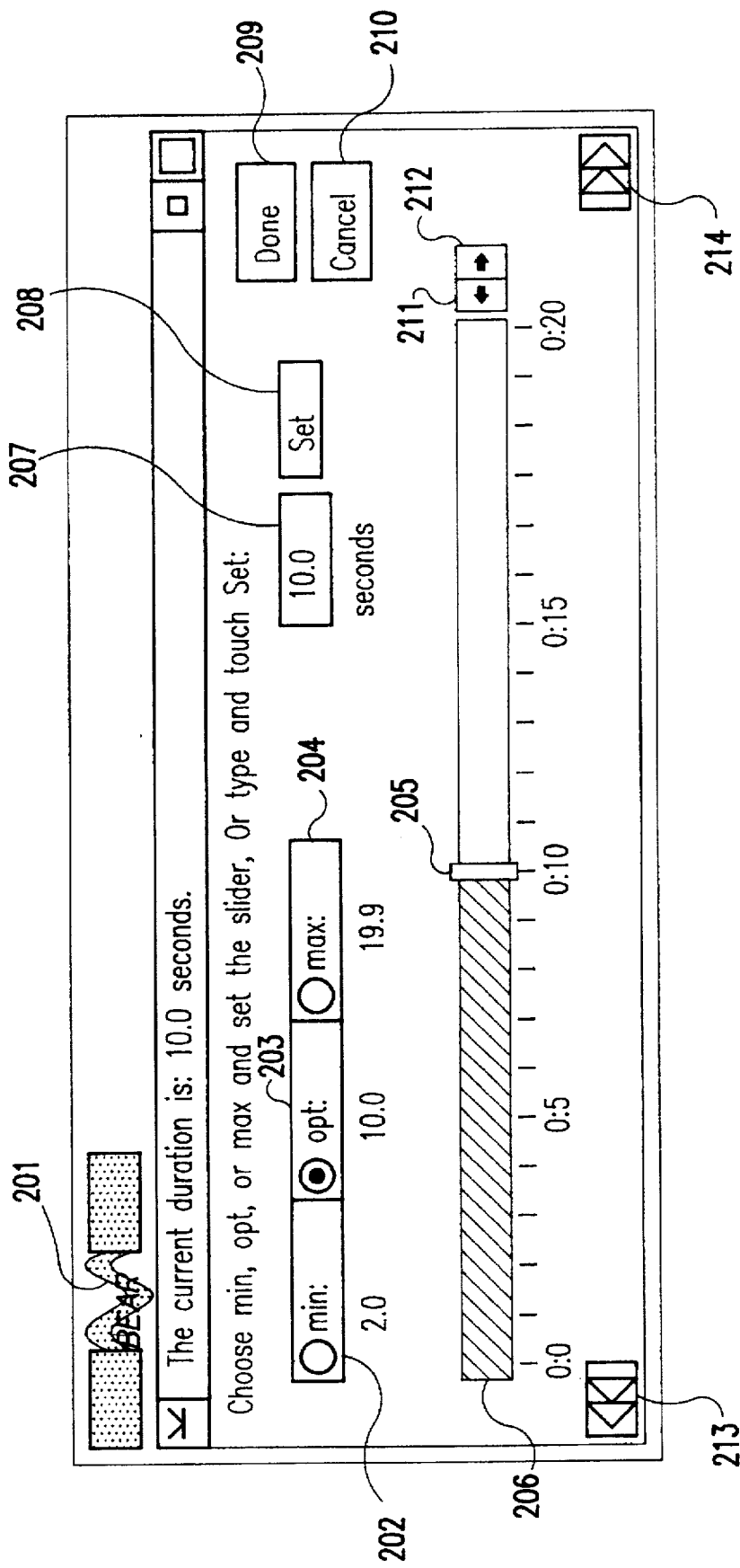
FIG. 1B is an illustration of a computer screen for inputting minimum, optimum and maximum play time duration for episodes of a multimedia story.

The user interactive screen shown in FIG. 1B is but one example that may be used in setting the triple of lengths for each episode in the list of episodes. Other techniques may be used. It is only necessary that the triple of lengths for each episode be input to the system.

In the invention, a "Time Box Model" is created. Consider a multimedia presentation including a number of multimedia objects arranged in a "story".

Building a story involves defining time intervals and relating them with temporal constraints. In the model of the present invention, the time boxes may be fixed or elastic. Such a feature is described in the related applications above and for brevity will not be described here.

A set of primitive relations is now given that can hold among an arbitrary number of objects:

cobegin (m1, . . . , mn):time interval $I_{m1}, \ldots, I_{mn}$ begin at the same time, coend (m1, . . . , mn):time interval $I_{m1}, \ldots, I_{mn}$ end at the same time, meet(m1, . . . , mn):time interval $I_{m(i+1)}$ immediately follows $I_{mi}$, i.e., for i=1, . . . , n−1, the end of $I_{mi}$ is the beginning of $I_{m(i+1)}$.

In contrast to the interval algebra of the conventional systems (e.g., conventional time lines along the vertical axis to represent time or use of multiple time lines, the constraint language of the present invention can express unordered n-ary relationships.

Also, as described further below, "dummy" objects can be defined which do nothing but are associated with intervals in order to effect a time delay. Such delays also allow such relationships to be expressed as an overlap with the above primitives. As discussed in further detail below, dummy objects are useful when events are on different layers (e.g., nonconsecutive). Along with the above three relations, the following is added:

cooccur (m1, m2):time intervals $I_{m1}$ and $I_{m2}$ begin and end at the same time, i.e., cobegin (m1, m2) and coend (m1, m2).

Certain types of multimedia objects, such as images or text, have no inherent temporal dimension associated with them such as sound, video, and computer animation. Let $m_i$ be such an object.

Then, $m_i$ can be included as part of a story by either asserting a range of intervals or defining it implicitly by using the cooccur relation. Similarly, for objects whose time lengths are stretchable, the cooccur relation can also be used to achieve synchronization.

Figure 2:
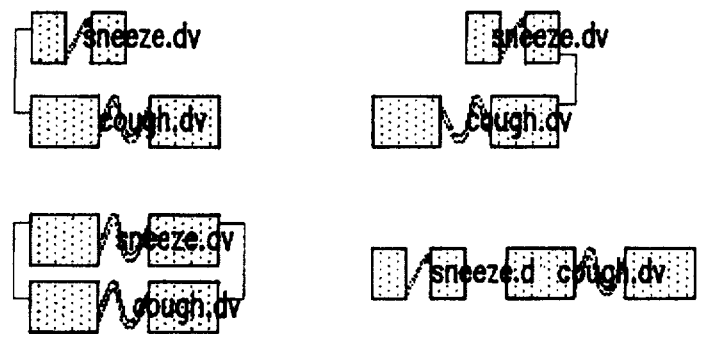
FIG. 2 illustrates four temporal relations for building.

FIG. 2 illustrates the four temporal relations graphically. Two short video objects, "sneeze" and "cough", are represented by two elastic timeboxes. Their lengths are shown in Table 1 below.

TABLE 1

|        | min | opt | max |
|--------|-----|-----|-----|
| sneeze | 3.4 | 3.4 | 7.0 |
| cough  | 5.0 | 6.8 | 9.0 |

A time interval $I_m$ can be viewed in terms of its two end-points, which will be called start($I_m$) and end($I_m$), where start($I_m$)<end($I_m$). The values of start($I_m$) and end($I_m$) are relative to the corresponding story S. A time interval $I_m$ is instantiated with respect to a story S when start($I_m$) and end($I_m$) are set relative to S.

An example of the above multimedia story is discussed below. First, consider a multimedia story composed of the following set of objects with corresponding triples of lengths, as set forth below in Table 2.

TABLE 2

|       | Type    | Min | Opt | Max |
|-------|---------|-----|-----|-----|
| baloo | text    | 3   | 3   | 15  |
| pond  | video   | 7   | 10  | 14  |
| delay | delay   | 1   | 3   | 5   |
| waltz | sound   | 10  | 10  | 10  |
| bear  | drawing | 3   | 3   | 20  |

The following constraints in Table 3 are also present.

TABLE 3

| costart | (pond, delay)  |
| meet    | (delay, baloo) |
| coend   | (pond, baloo)  |
| meet    | (delay, bear)  |
| meet    | (pond, waltz)  |
| coend   | (waltz, bear)  |

The graphical user interface for the system allows operators to directly manipulate time boxes. Operators may simply drag and drop time boxes, resize them, connect them, separate them, and delete them.

Figure 3:
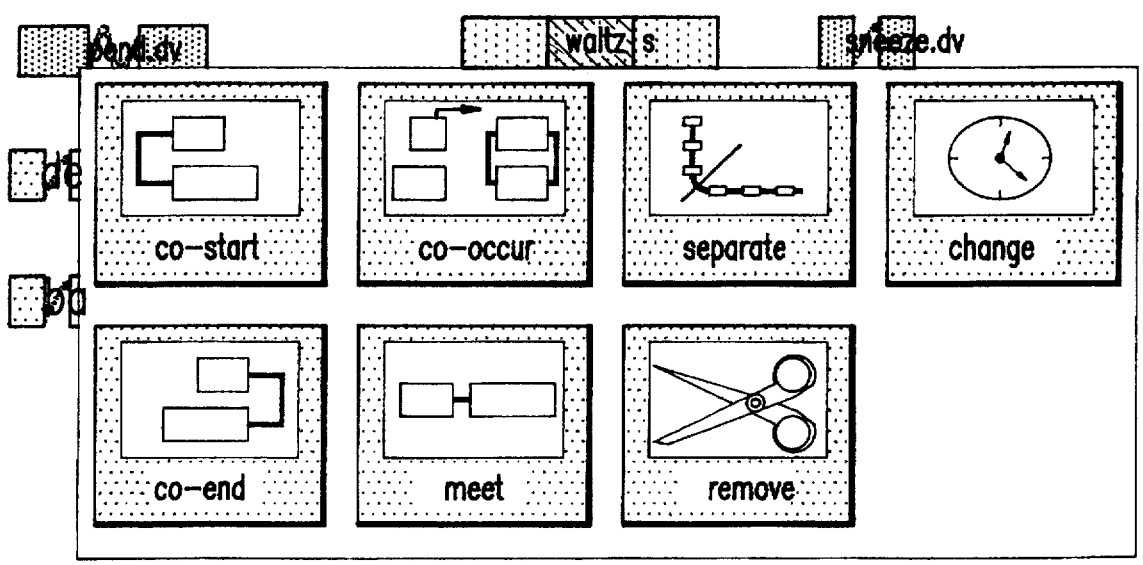
FIG. 3 illustrates the relating of two elements (e.g., "pond" and "waltz" by a specialized command (e.g., meet))

The interface to the system is menu-driven. For example, to relate "pond" and "waltz" by the relation meet, the operator touches ("clicks" upon) a time box to call up a menu, as shown in FIG. 3.

Figure 4:
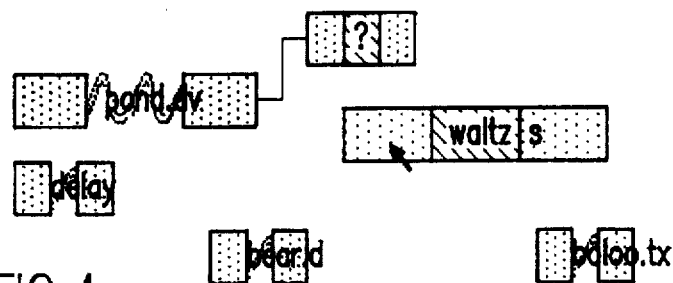
FIG. 4 illustrates another aspect of relating "pond" and "waltz" by the specialized command meet.
Figure 5:
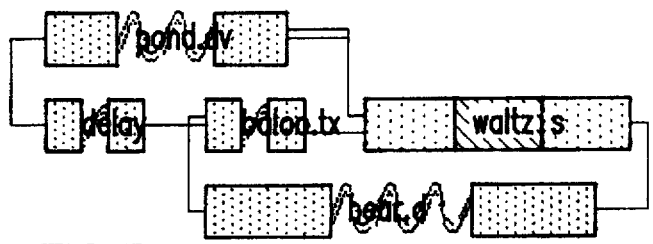
FIG. 5 illustrates a Time Box representation of a story.

When the operator selects the icon for meet, the menu disappears, and a time box with a question mark appears, as shown in FIG. 4. As the operator touches the "waltz" box, it replaces the question mark box, and the meet relationship is established between "pond" and "waltz". The time-box representation of the story "Baloo the bear" is shown in FIG. 5.

Figure 6:
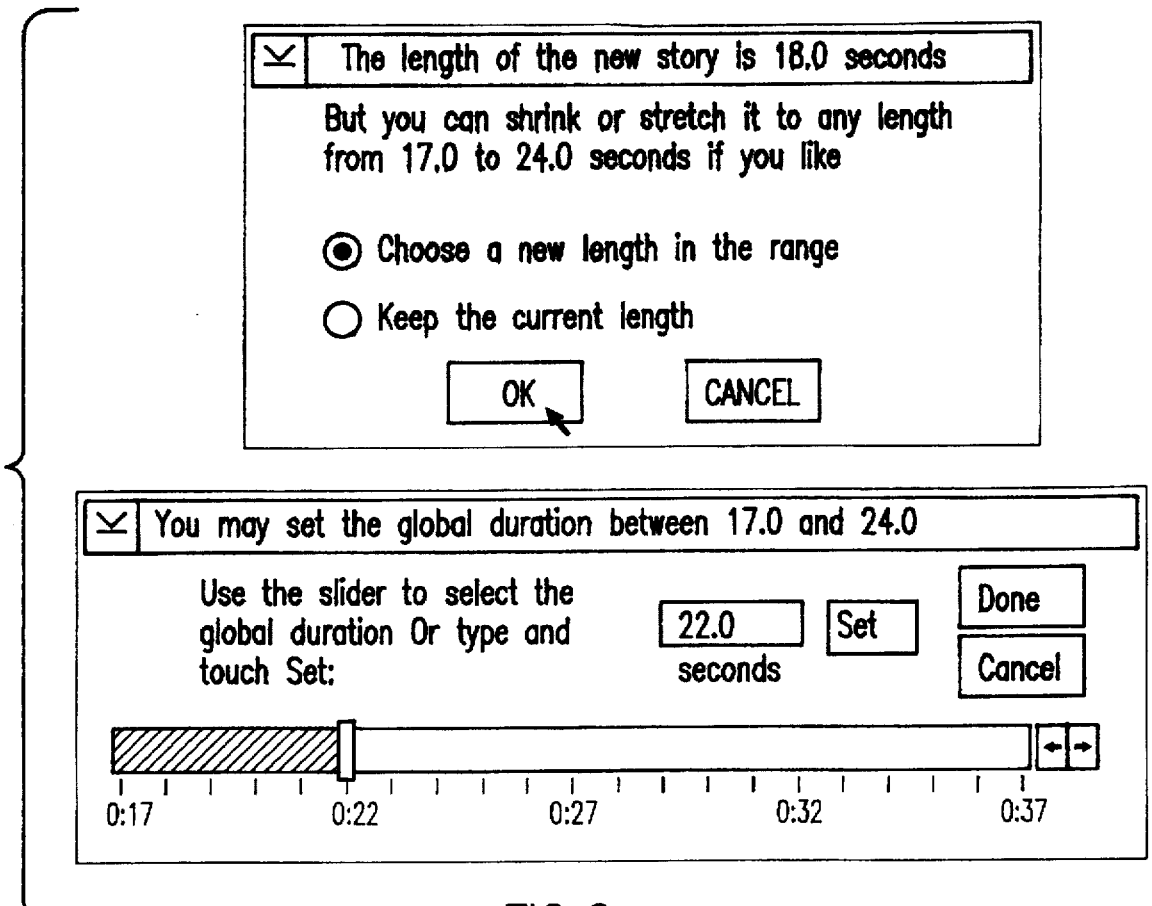
FIG. 6 is a view illustrating the adjustment operation of the duration of the story.

Turning to solutions for stories, a solution for a story is an instantiation of all of its time intervals that satisfies the given constraints. Assuming that there exists a solution for it, the operator attempts to find the minimum amount of stretching or shrinking. That is, the operator attempts to find the distance between assigned interval lengths and the optimum values of those intervals. FIG. 6 illustrates an adjustment operation of the duration of a story. However, the method of finding the minimum amount of stretching/shrinking is known and is the subject of some of the above related applications incorporated herein by reference. Thus, for brevity, the method will not be repeated here.

Turning now to the computation of time box diagrams, there are two basic approaches to computing time box diagrams. The first, which is referred to here as "static generation", involves computing the entire diagram at once (e.g., at the same time) and is discussed in detail below with reference to FIGS. 7–13J.

The second, called "dynamic generation", computes the diagram incrementally by adding one time box (e.g., episode) at a time in an order unknown in advance and is discussed further in detail below with reference to FIGS. 14–16.

Static generation is most appropriate for time box diagrams entirely created by the system, whereas dynamic generation is preferably in an interactive context in which the user creates the diagram one box at a time. Computing a time box diagram is a special case of the general problem of graph drawing.

Figure 7:
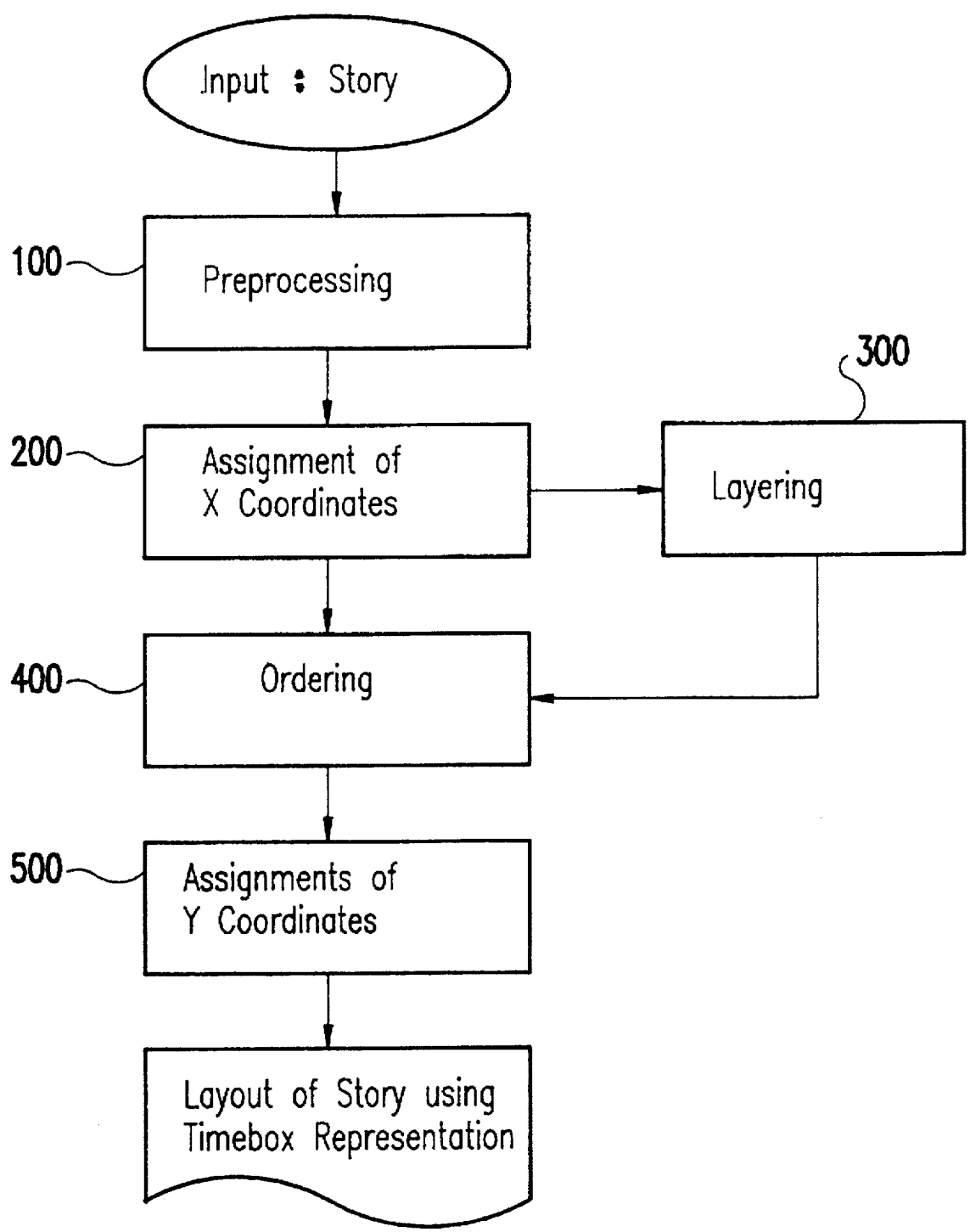
FIG. 7 illustrates a processing flow of a static generator according to the present invention.

For the static generator according to the present invention, a story is first input, and thereafter the process proceeds in five phases (steps), as shown generally in FIG. 7.

The first phase is a pre-processing phase 100, in which episodes are split into pairs of events (nodes).

In the second phase (e.g., assigning X coordinates phase 200), X coordinates are found.

In the third phase (e.g., a layering phase 300), the events are assigned to layers based on their location in time.

The fourth phase (e.g., an ordering phase 400) permutes the events on each layer, thereby fixing the topology of the drawing.

In the fifth phase (e.g., the assignment of Y coordinates phase 500), actual Y coordinates are computed for the episodes (e.g., time boxes). At the completion of the fifth phase, the layout of the story using time box representation is achieved.

Looking at the phases of the process in greater detail, prior to the preprocessing phase 100 a story is input. The story includes a set of episodes $\{E_i\}$ with a length $\{l_i\}$ (play duration) and a set of temporal relations for $\{E_i\}$. Further, $\epsilon$ is inputted which represents a minimum horizontal distance between time boxes and $\delta$ is inputted, which represents a minimum vertical distance between time boxes.

Turning to the detailed processing flow, the first phase 100 is preprecessing after input of the story. The processing flow of the first phase is shown in FIG. 8.

As shown in step 110 of FIG. 8, for each episode $E_i$ two events (nodes) are generated. That is, $B(E_i)$ (which means beginning of $E_i$) and $E(E_i)$ (which means the ending of $E_i$) are generated.

Figure 9A:
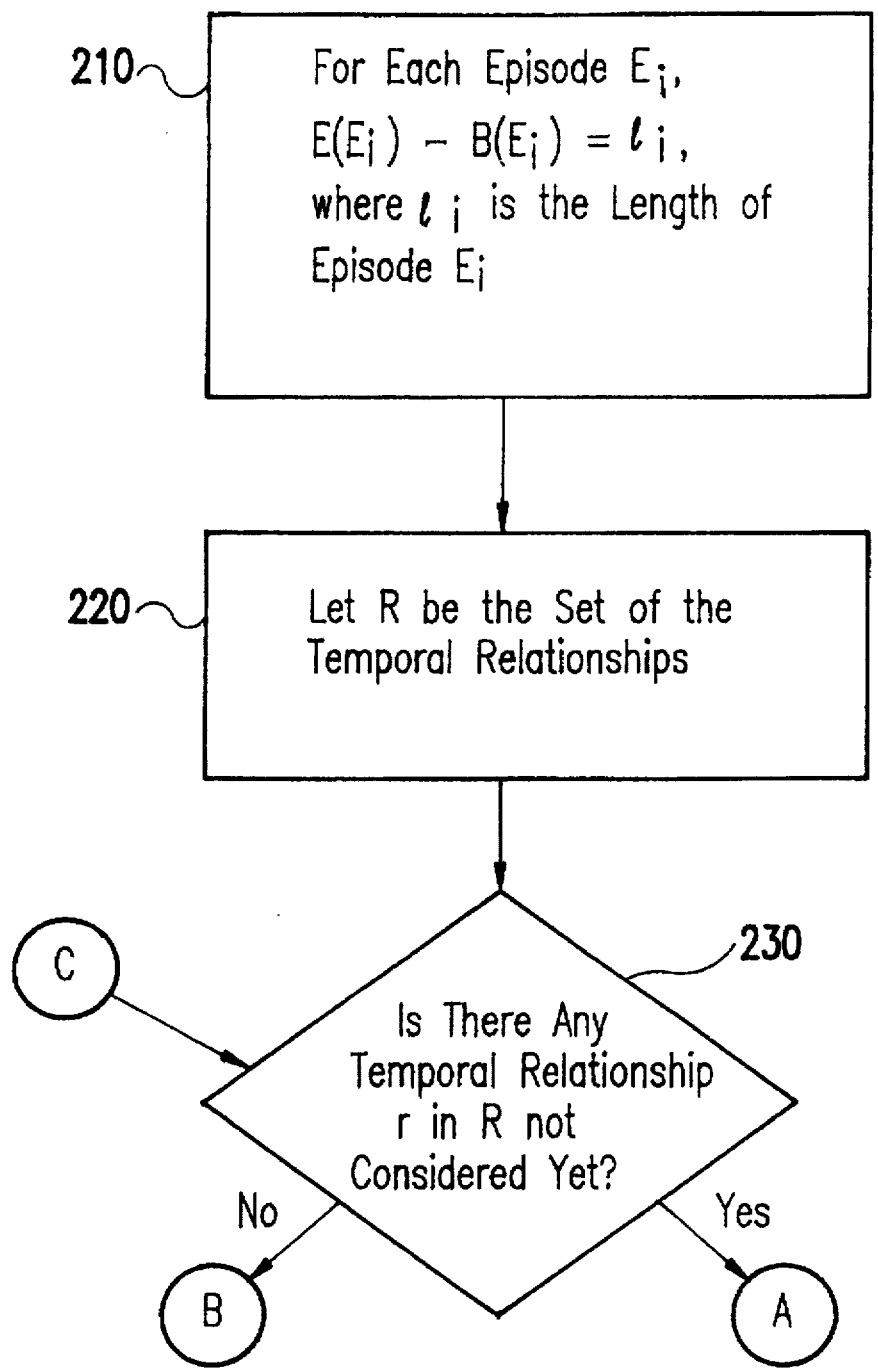
FIGS. 9A–9C illustrate the step 200 of assigning X coordinates according to the present invention.
Figure 9B:
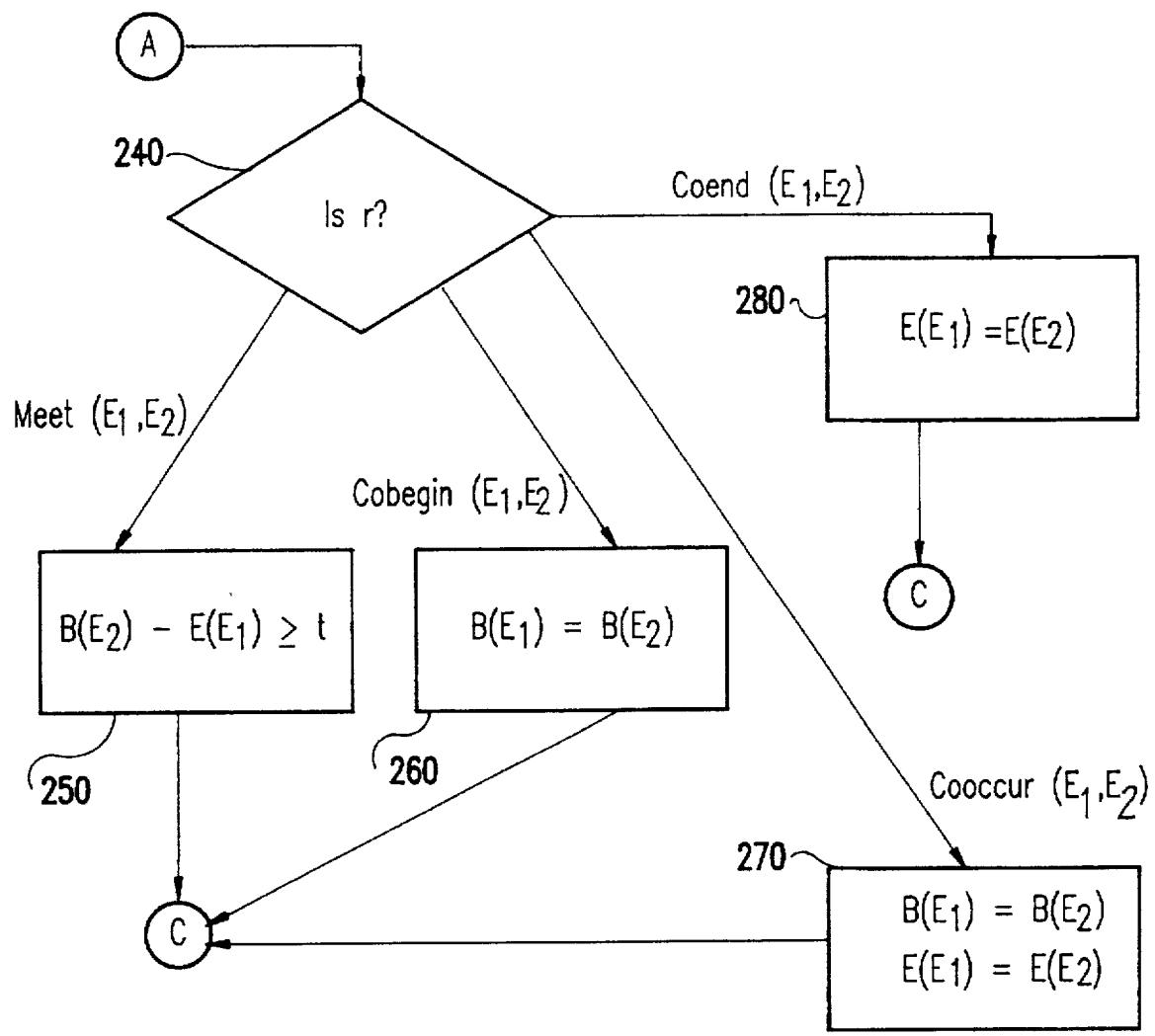

Referring to FIGS. 9A–9B, the second phase 200 is described in greater detail. In the second phase 200, the assignment of the X coordinates (e.g., the coordinates along the horizontal or time axis) is performed. Specifically, linear programming or the like is used to determine precise X coordinates for the episodes.

Referring to FIG. 9A, the process of assigning the X coordinates is shown. In step 210, for each episode $E_i$, the length of the beginning and ending of the episode is represented by a linear constraint. More specifically, length $l_i$ of episode $E_i$ is equal to $E(E_i)-B(E_i)$. R is given as the set of temporal relationships in step 220.

In step 230, it is determined whether any temporal relationships r in set R remain to be considered. If YES, the flow proceeds to step 240 (shown in FIG. 9B) where it is determined what relationship r represents.

Specifically, if r represents meet($E_1$, $E_2$), then the flow proceeds to step 250 and the relationship is transformed into a constraint of $B(E_2)-E(E_1) \geq \epsilon$, wherein $\epsilon$ is the predetermined horizontal minimum distance between time boxes. Thereafter, the process loops back to step 230 to determine if there are any other temporal relationships r in set R to be considered.

In step 240, if it is determined that r is cobegin($E_1$, $E_2$), then the flow proceeds to step 260 and the relationship is transformed into a constraint of $B(E_1)=B(E_2)$ and the process loops back to step 230 to determine if there are any other temporal relationships r in set R to be considered.

In step 240, if it is determined that r is cooccur($E_1$, $E_2$), then the flow proceeds to step 270 and the relationship is transformed into two linear constraints $B(E_1)=B(E_2)$ and $E(E_1)=E(E_2)$ and the process loops back to step 230 to determine if there are any other temporal relationships r in set R to be considered.

Finally, in step 240, if it is determined that r is coend($E_1$, $E_2$), then the flow proceeds to step 280 and the relationship is transformed into a linear constraint $E(E_1)=E(E_2)$ and the process loops back to step 230 to determine if there are any other temporal relationships r in set R to be considered.

Figure 9C:
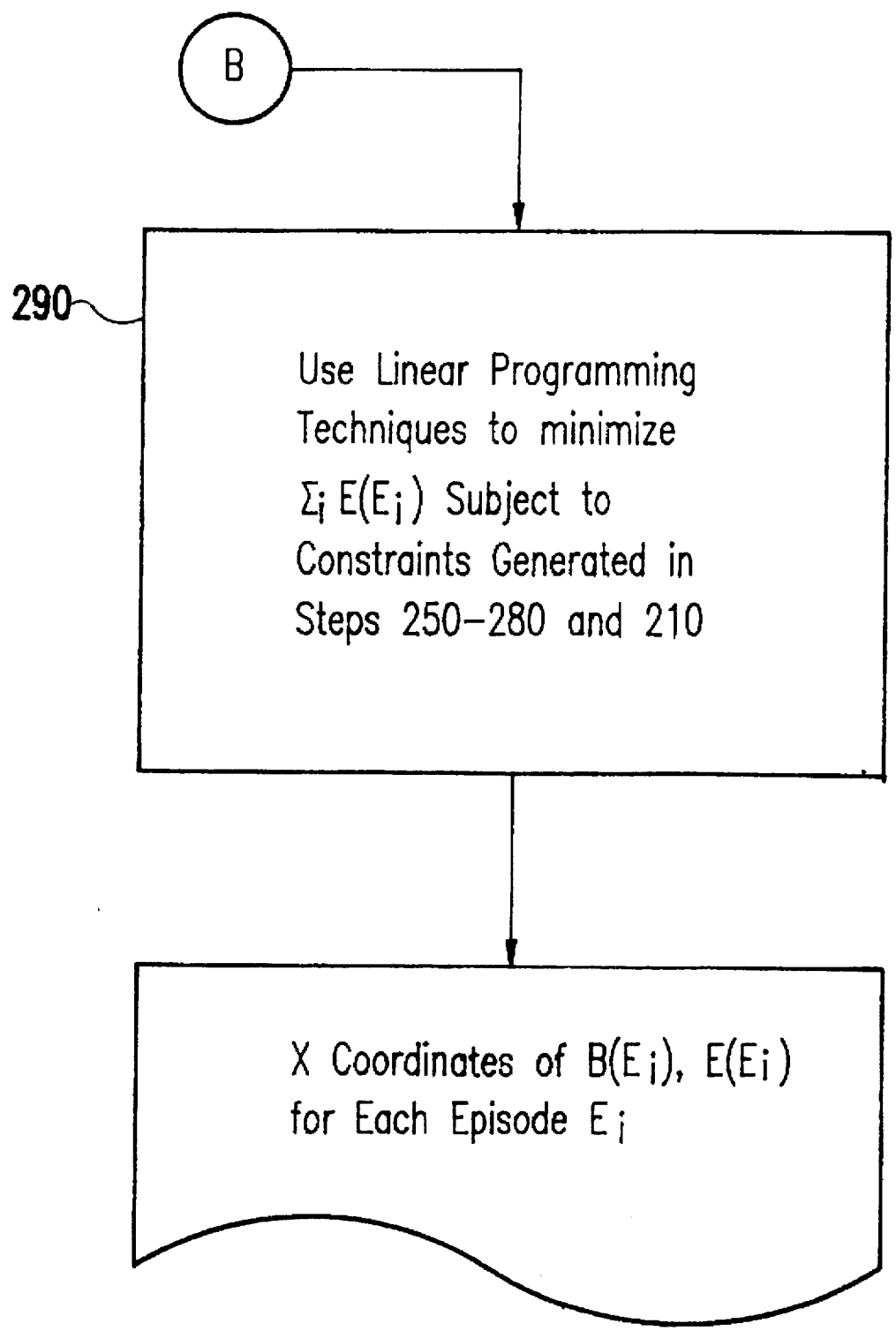

When all temporal relationships r in set R have been considered (e.g., NO is determined in step 240), the processing flow continues to step 290 shown in FIG. 9C.

In step 290, linear programming, such as the simplex method or the like, is used to minimize $\Sigma_i E(E_i)$ subject to the constraints generated in steps 250–280 and 210 above and thus to minimize event time. Thus, X coordinate values for $B(E_i)$, $E(E_i)$ for each episode are found.

Figure 10A:
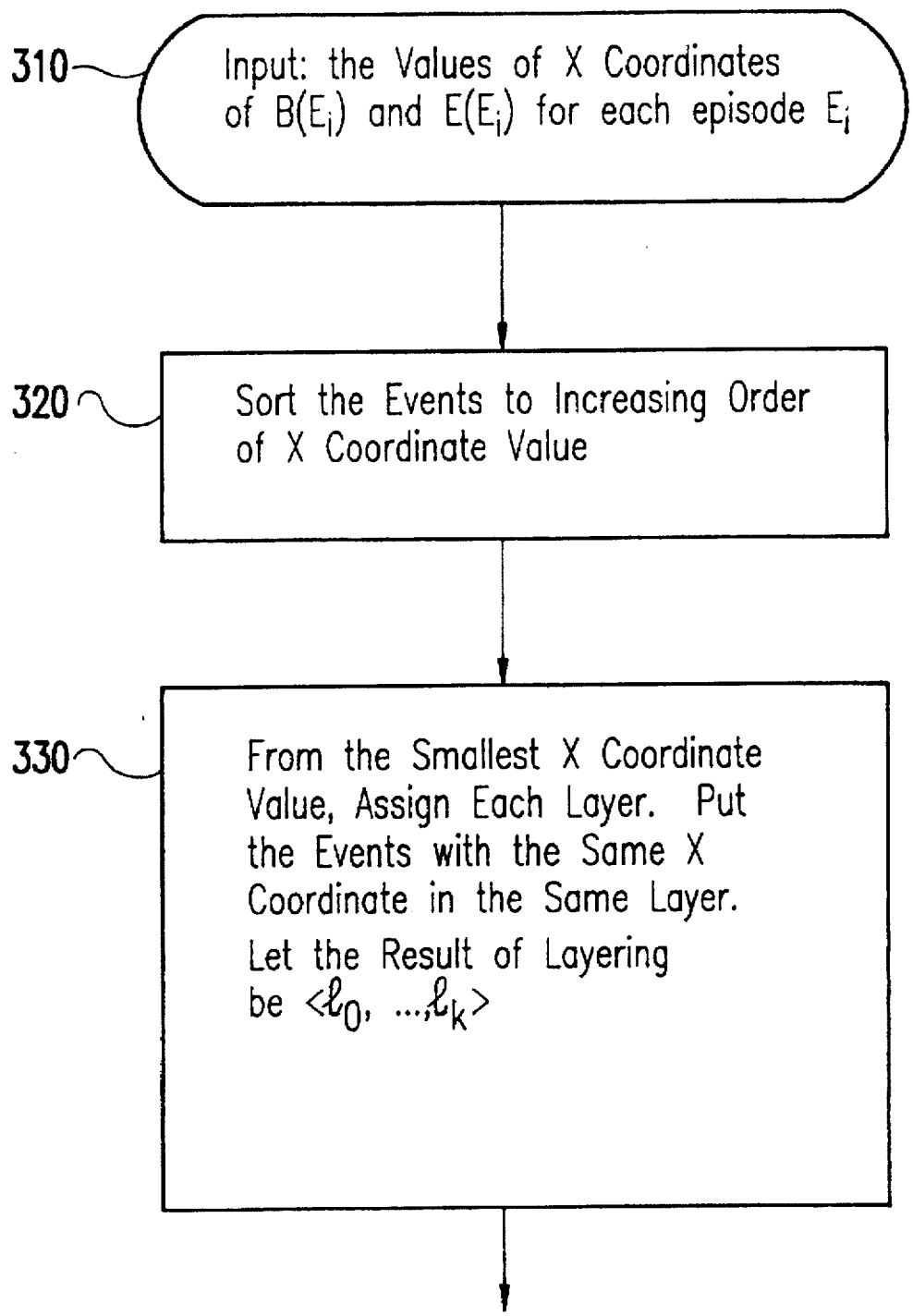

Referring to FIGS. 10A–10C, the third phase (layering) 300 assigns events (nodes) of episodes to layers based on their temporal location.

In step 310, the values of the X coordinates of $B(E_i)$ and $E(E_i)$ for each episode are input.

In step 320 of FIG. 10A, the events are sorted in increasing order with regard to the X coordinate values.

In step 330, starting from the smallest X coordinate value to the largest, a layer is assigned thereto. Events having the same X coordinate (e.g., same horizontal position) are placed in the same layer. The result of the layering is given as: $<L_0, \ldots, L_k>$.

In step 340, for each episode, if $B(E_i)$ and $E(E_i)$ are not on consecutive layers, dummy events (e.g., $d_1(E_i)$, $d_2(E_i)$, ..., $d_j(E_i)$) are inserted on the intermediate layers. Hence, for an edge from a node on layer i to a node on layer j, the algorithm creates dummy nodes on layers i+1, ..., j−1.

For each episode, a directed edge is inserted from $B(E_i)$ to $d_1(E_i)$, from $d_1(E_i)$ to $D_2(E_i)$, ..., and from $d_j(E_i$ to $E(E_i)$. Thus, the dummy events guarantee that edges only connect events (nodes) on consecutive layers.

By the same token, if $B(E_i)$ and $E(E_i)$ are on consecutive layers, only one edge is inserted from $B(E_i)$ to $E(E_i)$.

In step 360, for each meet($E_i$, $E_j$) (e.g., $E_j$ immediately follows $E_i$) if $E(E_i)$ and $B(E_j)$ are not on consecutive layers, dummy events $d_1(E_i, E_j)$, $d_2(E_i, E_j)$, ..., and $d_k(E_i, E_j)$ are inserted on the intermediate layers. Thus, dummy events are used for filling in "blank" (empty) layers.

In step 370, for each meet($E_i$, $E_j$), edges are inserted from $E(E_i)$ to $d_1(E_i, E_j)$, from $d_1(E_i, E_j)$ to $d_2(E_i, E_j)$, ..., and from $d_k(E_i, E_j)$ to $B(E_j)$.

If $E(E_i)$ and $B(E_j)$ are on consecutive layers, then only one edge is inserted from $E(E_i)$ to $B(E_j)$.

Figure 11:
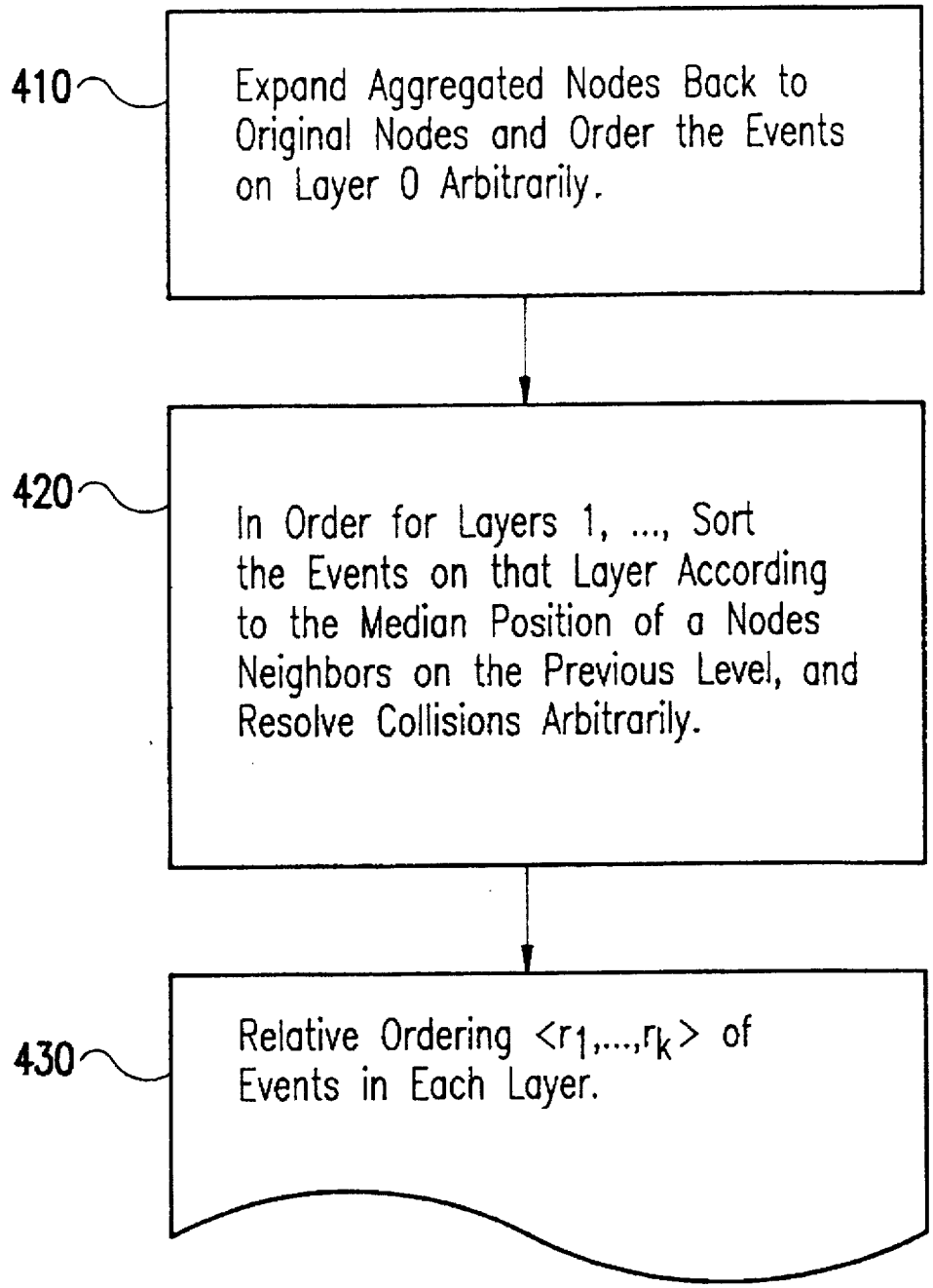
FIG. 11 illustrates the ordering step 400 of the processing flow of the static generator according to the present invention.

Referring to FIG. 11, the fourth phase 400 of ordering (e.g., deciding the relative orders of events on each layer) is performed. Thus, the inventive process vertically orders the events (nodes) on each layer. Thus, the relative vertical orders of events on each layer is determined.

As shown in FIG. 11, the ordering process is shown in greater detail. First, in step 410 the process orders the first layer (layer 0) arbitrarily.

In step 420, for each of the remaining layers (1, ..., n) from left to right, the events are sorted on that layer according to the median position of an event's (node's) neighbors on the previous level, and collisions are resolved arbitrarily.

For example, in layer $L_k$ events A and B are present and in layer $L_{k+1}$ events C and D are present. If there is an edge from A to C, from A to D, from B to C, and from B to D, the position of C is the median of position A and B, and likewise is D. This represents a "collision".

In step 430, the relative order of each event on each layer, is obtained from steps 410 and 420. Thus, the ordering step determines the topology of the diagram, since edge crossings are completely determined by the ordering on each layer.

In the fifth phase 500 and referring to FIG. 13A, the assignment of the Y coordinates (e.g., the coordinates along the vertical axis) is illustrated and is described hereinbelow. Generally, linear programming or the like is used to determine precise Y coordinates for the time boxes.

Specifically, for each episode, the relationship $y(B(Ei))=y(d_1(E_i))=\ldots=y(d_j(E_i))=y(E(E_i))$ is set, as shown in step 510. $d_k(E_i)$ represents the dummy events inserted between $B(E_i)$ and $E(E_i)$ inserted in step 340 above. Thus, step 510 makes sure that the Y coordinate is the same across a time box (episode) and relates to drawing the time box as a box.

In step 520, for each meet($E_i$, $E_j$), the relationship of $y(d_1(B(E_i, E_j)))=y(d_2(B(E_i, E_j)))=\ldots=y(d_k(E_i, E_j))=y(B(E_i, E_j))$ is set. $d_1(E_i, E_i)$ represents the dummy events inserted in step 360 described above. Thus, step 520 makes sure that, for example in a meet relationship, episode $E_i$ (time box) may be easily connected to episode $E_j$ even with multiple intermediate layers (dummy) therebetween and the Y coordinate is different.

Thus, as shown above, dummy events are useful for the time boxes and for the meet relationship.

In step 530, for each layer, $r_1, \ldots, r_k$ is set as the relative ordering of events on a layer (as determined in step 400 above). Then, $y(r_2)-y(r_1)$ is set greater than or equal to $\delta, y(r_3)-y(r_2)$ is set greater than or equal to $\delta, \ldots$, and $y(r_k)-y(r_{k-1})$ is set greater than or equal to $\delta$, where $\delta$ is the predetermined minimum vertical distance between time boxes.

In step 540, subject to the constraints from steps 510 to 530, linear programming is used with the objective function [min$\Sigma$ |y($e_i$)-y($e_j$)|] for each pair of events, and $e_j$, such that:

{$e_i$ is either $B(E_k)$ or $E(E_k)$ and $e_j$ is either $B(E_1)$ or $E(E_1)$; and {meet ($E_k$, $E_1$) or
cobegin ($E_k$, $E_1$) or
coend ($E_k$, $E_1$) or
coocur ($E_k$, $E_1$)} for some episodes $E_k$ and $E_r$.

Thus, at the conclusion of the Y coordinate assignment step, in step 550 the Y coordinate values for each event are found. Moreover, at the end of the fifth phase 500, all time boxes have been assigned X and Y coordinates and as shown the layout of the story using time box representation is achieved.

An example and corresponding results at various steps of the process of the static generator processing flow of FIG. 7 is given below and in FIGS. 13A-13J. Obviously, this is simply one example of the process, as is known by one of ordinary skill in the art within the purview of this application. Further, it is noted that the example is not complete in that it does not show all the steps or their results.

First, a story is input having five episodes $E_1$, $E_2$, $E_3$, $E_4$, and $E_5$. Temporal relationships are established of cobegin ($E_1$, $E_4$), meet($E_1$, $E_2$), meet($E_2$, $E_3$), meet($E_4$, $E_5$), and coend($E_3$, $E_5$). $\epsilon$ is set to 3 and $\delta$ is set to 2. The length of the episodes in this example are $l_1=3$, $l_2=4$, $l_3=5$, $l_4=7$, and $l_5=5$.

A set of events is generated as shown below. More specifically, the result of 110 is as follows:

{B($E_1$), E($E_1$), B($E_2$), ..., E($E_5$)}

The results of each of steps 260-280 of the assigning of X coordinates (e.g., the coordinates along the horizontal axis) processing are shown in FIG. 13A. As mentioned previously, if in step 240, it was determined that r is cobegin($E_1$, $E_2$), then step 260 is processed and the linear constraint $B(E_1)=B(E_2)$ is generated. In step 270, if it was determined that r is cooccur($E_1$, $E_2$), then the flow proceeds to step 270 and the linear constraints $B(E_1)=B(E_2)$ and $E(E_1)=E(E_2)$ are generated. Similarly, in step 280, if it was determined that r is coend($E_1$, $E_2$) in step 240, then the linear constraint $E(E_1)=E(E_2)$ is generated.

The results of steps 210 and 250 based on the above example are shown in FIGS. 13B and 13C. As mentioned earlier, in step 210, for each episode $E_i$, the length of the beginning and ending of the episode is found. More specifically, length $l_i$ of episode $E_i$ generates a linear constraint of $E(E_i)-B(E_i)=l_i$. For step 250, if r represents meet($E_1$, $E_2$) as determined in step 240, then the linear constraint $B(E_2)-E(E_1) \geq \epsilon$ is generated.

Figure 13E:
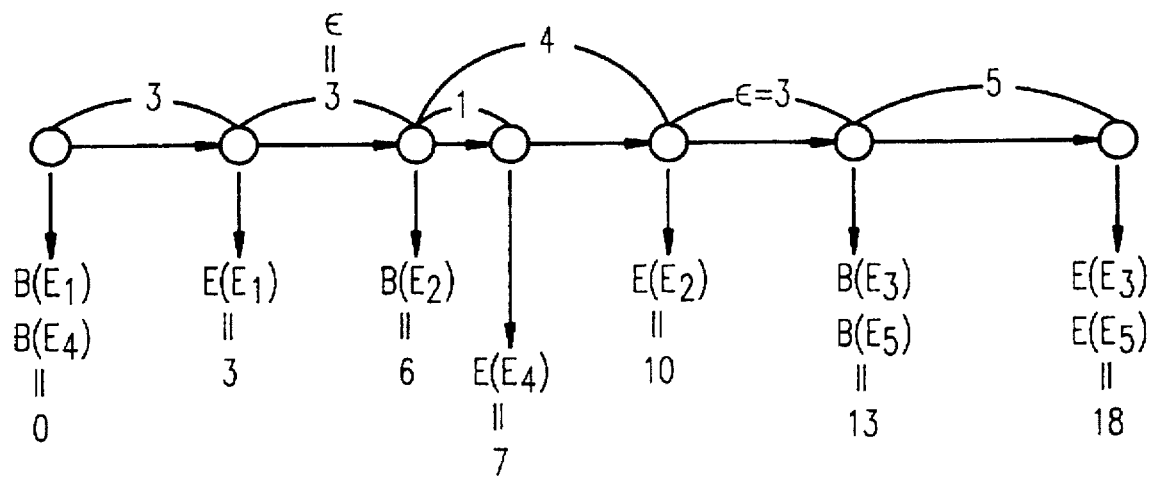

The objective function of step 290 of the above example is shown in FIG. 13D. The result of the assigning of the X coordinates of step 290 of phase 2 is shown in FIG. 13E. The leftmost position of FIG. 13E represents the origin (in terms of the X coordinate) or beginning of the episodes or story. In step 290, linear programming is used to minimize $\Sigma_i E(E_i)$ subject to the constraints generated in steps 250-280 and step 210 above. Thus, X coordinate values for $B(E_i)$, $E(E_i)$ for each episode are found, as shown in FIG. 13E.

Figure 13F:
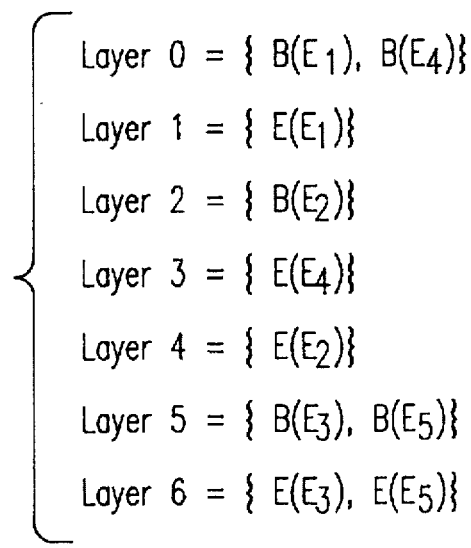

The result of the layering step 330 is shown in FIG. 13F. That is, in step 330, starting from the smallest X coordinate value to the largest, a layer is assigned thereto. Events having the same X coordinate (e.g., same horizontal position) are placed in the same layer. The result of the layering is given as shown.

The results of the relative ordering of events in each layer (step 420) is illustrated in FIG. 13G. In step 420, for each of the remaining layers from left to right, the events are sorted on that layer according to the median position of an events's (node's) neighbors on the previous level, and collisions are resolved arbitrarily.

As noted previously, in the layering step, dummy events (e.g., $d_1(E_4)$, $d_2(E_4)$ etc.) are inserted when the beginning and end of the time boxes (episodes) are on nonconsecutive layers and when the two events connected by the meet relationships of the episodes are not on consecutive layers.

The results of steps 510 and 530 are shown in FIGS. 13H-13I, respectively. In the step 510, for each episode $E_i$, the relationship $y(B(E_i))=y(E(E_i))$ is set, as shown. In step 530, the result of relative ordering is shown.

Specifically, in step 530, for each layer, $r_1, \ldots, r_k$ is set as the relative ordering of events on a layer (as determined in step 400 above). Then, $y(r_2)-y(r_1)$ is set greater than or equal to $\delta$, $y(r_3)-y(r_2)$ is set greater than or equal to $\delta, \ldots$, and $y(r_k)-y(r_{k-1})$ is set greater than or equal to $\delta$, where $\delta$ is the predetermined minimum vertical distance between time boxes.

FIG. 13J illustrates the objective function of step 540 in which subject to the constraints from steps 510 to 530, linear programming is used with the objective function for each pair of events.

Figure 14:
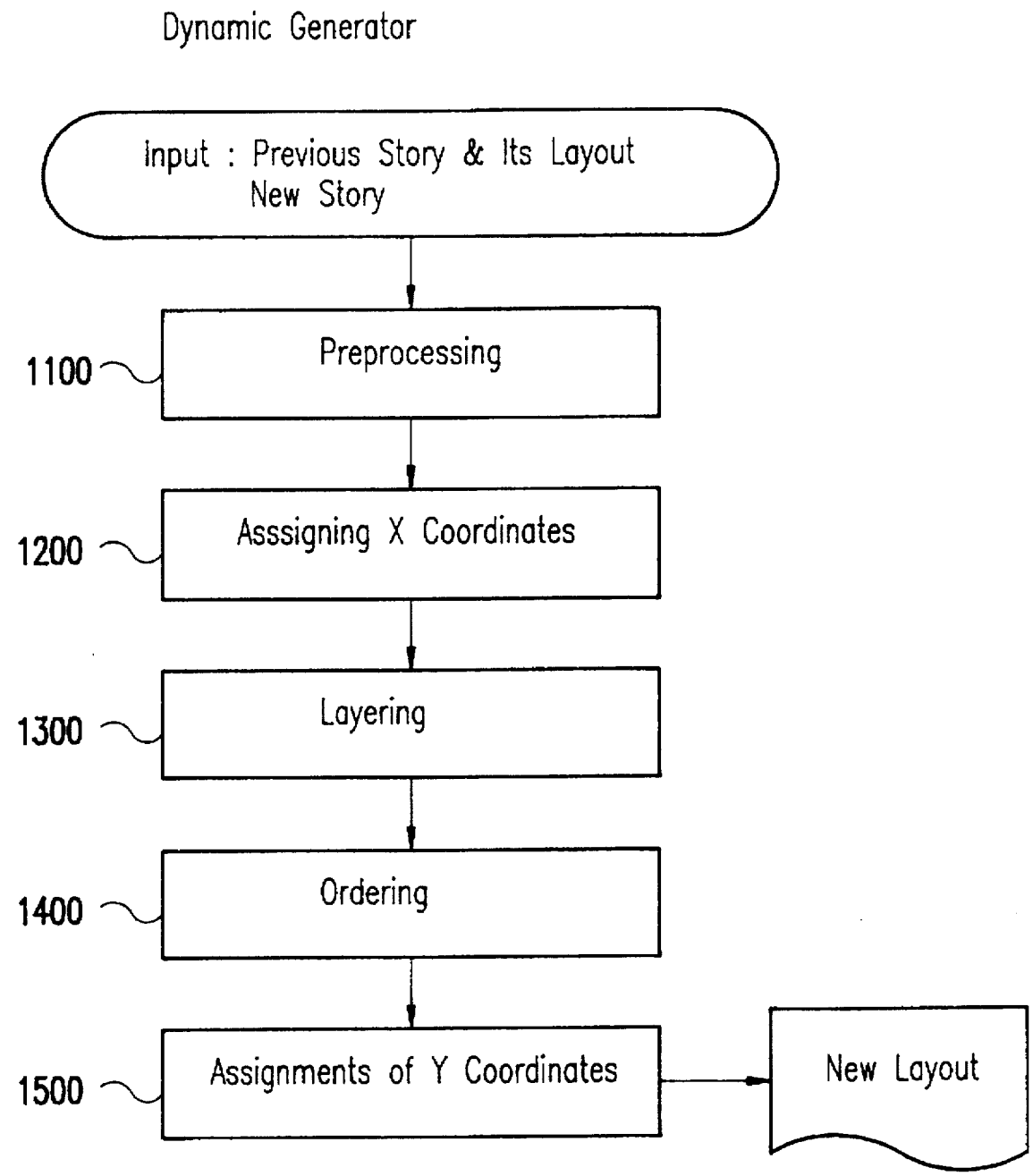
FIG. 14 illustrates a processing flow of a dynamic generator according to the present invention.

Turning to the dynamic generator of the invention and referring to FIG. 14, the processing steps 1100–1500 for the dynamic generator is shown. Inputted to the dynamic generator are the previous story and layout and the new story of which the new layout is to be computed according to the present invention.

In drawing the time box diagram, with the invention the changes are reflected between the previous story and the new story, and the invention makes drawing the new story with the smallest amount of changes possible from the previous story. The steps used by the dynamic generator are the same as the static generator, with small changes being made in steps 1200, 1400 and 1500 (step 1100 is the same as step 100 for the static generator and step 1300 is the same as step 300 of the static generator). Thus, FIGS. 15–16 illustrate and hereinbelow are described only the changes in the steps 1200 1400, and 1500.

In each step, if there is anything which can be reused from the calculation of the time box diagram of the previous story, it is used to compute the drawing of the new story in the dynamic generator.

Step 1200 is the same as step 200 of the static generator discussed above (and as shown in FIGS. 9A–9C). The only change is reflected in step 2900 of the dynamic generator (which roughly corresponds to step of 290 of the static generator described above).

Specifically, in step 2900, linear programming is used to minimize $\Sigma |X_{new}(ni) - X_{prev}(ni)|$, where $n_i$ is either $B(E_k)$ or $E(E_k)$ for some episode $E_k$. $X_{new}$ represents the X coordinate of an event in the new story, whereas $X_{prev}$ represents the X coordinate of an event in the previous story. The objective function above makes sure that the horizontal position of the times boxes of the new story minimally change from the time box diagram of the previous story.

Figure 16:
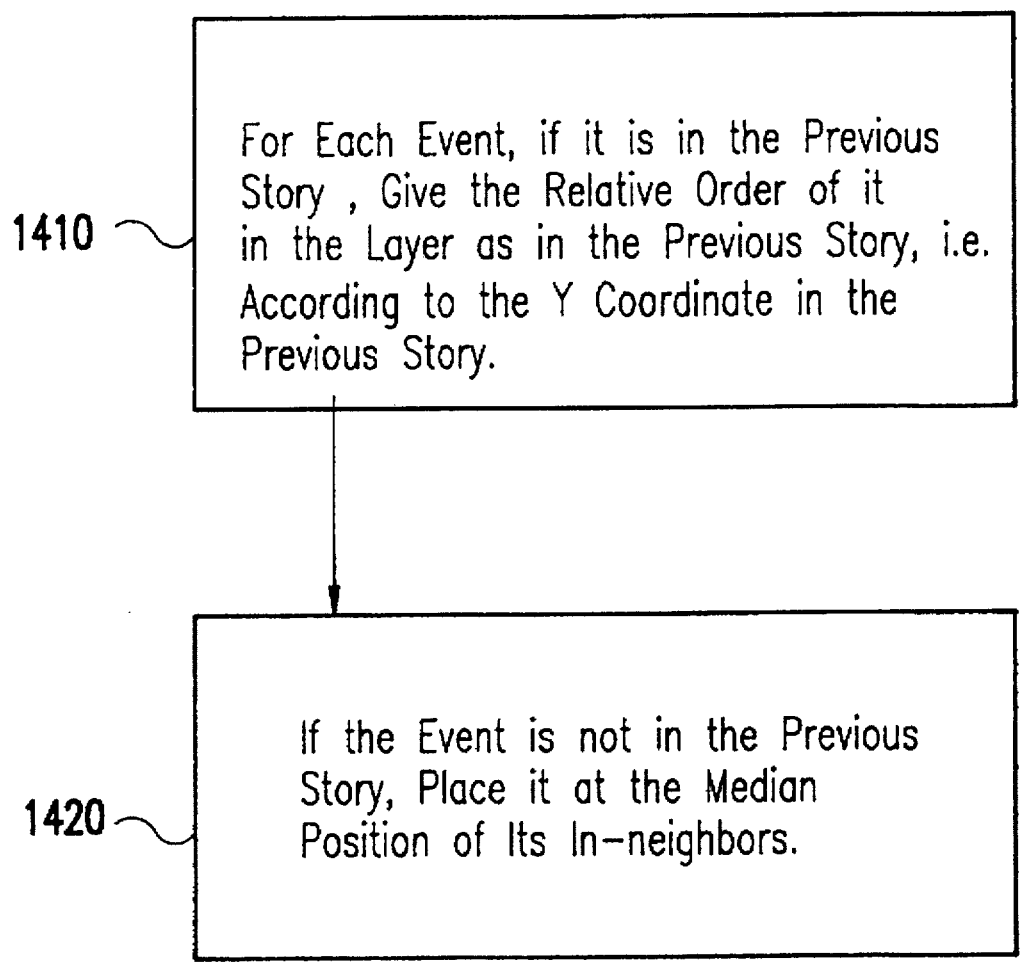
FIG. 16 illustrates the step of ordering with the dynamic generator according to the present invention.

In the ordering step 1400, as shown in FIG. 16, starting from layer 0 to the last layer, the following steps are performed.

In step 1410, for each event, if it is in the previous story, it is given the relative order of it in the layer as in the previous story, i.e., according to the y coordinate in the previous story.

In step 1420, if the event is not in the previous story, the event is placed at the median position of its in-neighbors.

Regarding the step of the assignments of y coordinates (step 1500), this step is performed exactly the same as in the static generator step 500, which is detailed in steps 510–540. The only change is given to the objective function in step 540. In the dynamic generator, the new objective function is min (M $\Sigma$ |$y_{new}(n_i) - y_{prev}(n_i)$|+$\Sigma(y_{new}(e_i) - y_{new}(e_j))$), where $n_i$ is either $B(E_k)$ or $E(E_k)$ for some episode $E_k$ and $e_i$ is explained in step 530 above. $y_{new}$ represents the y coordinate in the new story, whereas $y_{prev}$ represents the y coordinate in the previous story, and M is any positive integer. If M is larger, then the amount of change is smaller. With the objective function above, it is made sure that the vertical position of the times boxes of the new story minimally change from the time box diagram of the previous story.

Thus, the present invention provides a novel approach to representing multimedia documents. A key feature of the invention is focusing upon the temporal dimension of multimedia elements by expressing them as time boxes, and on the arrangement of these elements in terms of a system of temporal constraints. The present invention provides a unique and unobvious method of computation such time boxes in terms of both solving the system of constraints and of visualizing the system as a time box diagram.

Moreover, the present invention uses the temporal relationships among multimedia objects to describe a multimedia document as a temporally constrained system. In the inventive model for a multimedia document, multimedia objects are the fundamental electronic building blocks. Just as ordinary building blocks can be stacked or placed next to each other, the inventive electronic building blocks can be constrained to start together, end together, occur one after the other, or coincide. The documents themselves have lengths in the temporal dimension and these lengths can be "stretched."

Visually, the electronic building blocks are represented with "time boxes" and the time boxes have lengths corresponding to the lengths of the documents. The present invention represents the system of temporal constraints with time box diagrams. In these two-dimensional diagrams, the horizontal direction denotes time, and the vertical direction is used to show concurrency of blocks.

The invention determines horizontal positions for the time boxes that conform to the temporal constraints and determines vertical positions so as to maximize the legibility and aesthetics of the diagram. Moreover, the present invention is directed to developing the time box model and the computation of time box diagrams. Thus, in contrast to the conventional systems which deal with time as a time line or a multiple time lines, the present invention allows a much easier method of composing and playing multimedia documents since temporal constraints are dealt with as relationships and not necessarily in absolute terms.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of representing a multimedia document comprising steps of:

inputting to a processor parameters of a multimedia document; and constructing a time box diagram representing a graphical representation of said multimedia document, said step of constructing said time box diagram comprising forming a plurality of time boxes, each corresponding to a multimedia object, based on said parameters of said multimedia document, said parameters including a plurality of temporal relationships associated with said multimedia document, wherein said time boxes can be graphically manipulated to edit a temporal parameter of said corresponding multimedia object.

2. A method according to claim 1, wherein said multimedia document comprises at least one episode, said constructing step includes for each episode:

generating first and second events and temporal constraints;

determining from the temporal constraints first coordinates of each of said first and second events for each of said episodes; and assigning said first and second events to layers such that for each said episode said first and second events are temporally connected.

3. A method according to claim 2, wherein said constructing step further comprises:

determining a relative order of events on each of said layers;

determining from the relative order of said events on each layer and said temporal constraints second coordinates of each of said first and second events for each of said episodes; and generating a display of said story.

4. A method according to claim 1, wherein said constructing step comprises representing said objects by said time boxes and forming lengths of said times boxes such that said lengths are proportional to a play duration of respective ones of said objects.

5. A method according to claim 1, wherein said multimedia document comprises a plurality of objects, and wherein said constructing step comprises at least one of dragging, stacking and connecting said time boxes to represent different ones of said objects in said multimedia document.

6. A method according to claim 1, wherein said multimedia document comprises a plurality of objects, said objects comprising said episodes within said multimedia document, said episodes having one of a fixed play duration and an elastic play duration, wherein, for said episodes with said elastic play duration, said constructing step comprises forming a time box to have an elastic property such that a first time box is extendable to a second time box.

7. A computer implemented method of drawing a time box diagram of a multimedia story including at least one episode comprising steps of:

inputting to a processor story data comprising at least one episode;

for each episode of said at least one episode, generating first and second events and temporal constraints;

determining, from the temporal constraints, first coordinates of each of said first and second events for each of said episodes;

assigning said first and second events to layers based on a temporal position of said first and second events such that for each said episode said first and second events are temporally connected;

permuting an order of events on each layer of said layers;

determining from the order of said events on each layer and said temporal constraints second coordinates of each of said first and second events for each of said episodes; and generating a graphical time box diagram of said story, wherein said first and second events can be graphically manipulated to edit a temporal constraint.

8. A method according to claim 7, wherein said first and second events comprise a beginning of an event and end of an event, respectively.

9. A method according to claim 7, wherein said first and second coordinates comprise time line axis coordinates and other than time line axis coordinates.

10. A method according to claim 7, wherein events having a same first coordinate are placed in a same layer.

11. A method according to claim 7, wherein said assigning step is performed based on the temporal location of said first and second events of said episodes.

12. A method according to claim 7, wherein when events are positioned in nonconsecutive layers, dummy events are positioned between the first and second events on layers intermediate to said nonconsecutive layers.

13. A method according to claim 7, wherein said ordering step comprises ordering events on a first layer arbitrarily and thereafter ordering said events on a subsequent layer according to a median position of an event's neighbors on a previous layer.

14. A method according to claim 7, wherein said method of drawing is performed statically such that said step of generating a layout of said story is performed for said story.

15. A method according to claim 7, wherein said method of drawing is performed dynamically such that said step of generating a layout of said story is performed by minimally changing a previous layout of a story such that the layout changes upon an operator's changes to the multimedia story.

16. An apparatus for drawing a multimedia story using a time box diagram including at least one episode comprising:

a processor;

means for inputting to said processor story data comprising at least one episode;

means for generating, for each episode of said at least one episode, first and second events and temporal constraints;

means for determining, from the temporal constraints, first coordinates of each of said first and second events for each of said episodes;

means for assigning said first and second events to layers based on a temporal position of said first and second events such that for each said episode said first and second events are temporally connected;

means for permuting an order of events on each layer of said layers;

means for determining from the order of said events on each layer and said temporal constraints second coordinates of each of said first and second events for each of said episodes;

means for generating a layout of said story comprising said time box diagram; and means to allow a user to graphically resize and reposition said events.

17. An apparatus according to claim 16, wherein said first and second events comprise a beginning of an event and end of an event, respectively, and wherein said first and second coordinates comprise time line axis coordinates and other than time line axis coordinates.

18. An apparatus according to claim 16, wherein events having a same first coordinate are placed in a same layer and wherein said means for assigning performs said assigning based on the temporal location of said first and second events of said episodes.

19. An apparatus according to claim 16, further comprising means for positioning dummy events between the first and second events on layers intermediate to nonconsecutive layers when events are positioned in nonconsecutive layers.

20. An apparatus according to claim 16, wherein said means for ordering comprises means for ordering events on a first layer arbitrarily and thereafter ordering said events on a subsequent layer according to a median position of an event's neighbors on a previous layer.

* * * * *